(12) United States Patent
Hayashi (10) Patent No.: US 11,823,394 B2
(45) Date of Patent: Nov. 21, 2023

(54) INFORMATION PROCESSING APPARATUS AND METHOD FOR ALIGNING CAPTURED IMAGE AND OBJECT

(71) Applicant: CANON KABUSHIKI KAISHA, Tokyo (JP)

(72) Inventor: Masayuki Hayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 527 days.

(21) Appl. No.: 17/063,550

(22) Filed: Oct. 5, 2020

(65) Prior Publication Data

US 2021/0104052 A1 Apr. 8, 2021

(30) Foreign Application Priority Data

Oct. 8, 2019 (JP) .................... 2019-185352

(51) Int. Cl.
*G06T 7/246* (2017.01)
*G06T 7/73* (2017.01)
(Continued)

(52) U.S. Cl.
CPC ............. *G06T 7/248* (2017.01); *G06T 7/50* (2017.01); *G06T 7/74* (2017.01); *G06V 10/255* (2022.01); *G06V 20/20* (2022.01); *G06T 2207/10012* (2013.01); *G06T 2207/10028* (2013.01); *G06T 2207/20076* (2013.01); *G06T 2207/20081* (2013.01); *G06T 2207/30204* (2013.01); *G06V 10/62* (2022.01)

(58) Field of Classification Search
CPC . G06T 7/248; G06T 7/74; G06T 1207/10013; G06T 1207/10028
See application file for complete search history.

(56) References Cited

U.S. PATENT DOCUMENTS

2017/0132806 A1* 5/2017 Balachandreswaran ..................... G06T 7/55
2018/0268237 A1* 9/2018 Stanimirovic ....... G06V 10/143

OTHER PUBLICATIONS

Bleser, G; Wuest, H.; Strieker, D.; "Online camera pose estimation in partially known and dynamic scenes," Mixed and Augmented Reality, 2006, ISMAR 2006, IEEE/ACM International Symposium, pp. 56-65, Oct. 22-25, 2005 (Year: 2005).*

(Continued)

*Primary Examiner* — Myron Wyche
(74) *Attorney, Agent, or Firm* — CANON U.S.A., INC. IP Division (57) ABSTRACT

An apparatus includes an extraction unit configured to extract a plurality of feature information from an image obtained by capturing a real space including a tracking target object, an index estimation unit configured to detect an index arranged on the tracking target object from the image, and estimate a position and orientation of the index, a target object estimation unit configured to estimate a position and orientation of the tracking target object based on the position and orientation of the index and a tracking target model, a classification unit configured to classify the plurality of feature information based on a position and orientation of a camera capturing the real space and the position and orientation of the tracking target object, and a construction unit configured to add feature information determined as belonging to the tracking target object by the classification unit, to the tracking target model.

15 Claims, 7 Drawing Sheets

(51) Int. Cl.
*G06T 7/50* (2017.01)
*G06V 10/20* (2022.01)
*G06V 20/20* (2022.01)
*G06V 10/62* (2022.01)

(56) References Cited

OTHER PUBLICATIONS

Hirokazu Kato, et al.; "Marker Tracking and HMD Calibration for a Video-based Augmented Reality Conferencing System;" Faculty of Information Sciences, Hiroshima City University; Faculty of Information Sciences, Hiroshima City University, pp. 1-10.

João Paulo Lima, et al.; "Model Based Markerless 3D Tracking applied to Augmented Reality;" SBC Journal on 3D Interactive Systems, vol. 1, 2010; pp. 1-14.

Georg Klein; "Parallel Tracking and Mapping for Small AR Workspaces;" Active Vision Laboratory; Department of Engineering Science; University of Oxford; pp. 1-10.

* cited by examiner

| IDENTIFIER OF FEATURE | 0 | 1 | 2 | ... |
|---|---|---|---|---|
| IMAGE COORDINATES | $u_0, v_0$ | $u_1, v_1$ | $u_2, v_2$ | |
| THREE-DIMENSIONAL COORDINATES IN CAMERA COORDINATE SYSTEM | $X_{c0}, Y_{c0}, Z_{c0}$ | $X_{c1}, Y_{c1}, Z_{c1}$ | $X_{c2}, Y_{c2}, Z_{c2}$ | |
| CLASSIFICATION | | | | |

FIG. 4B

| IDENTIFIER OF FEATURE | 0 | 1 | 2 | ... |
|---|---|---|---|---|
| IMAGE COORDINATES | $u_0, v_0$ | $u_1, v_1$ | $u_2, v_2$ | |
| THREE-DIMENSIONAL COORDINATES IN CAMERA COORDINATE SYSTEM | $X_{c0}, Y_{c0}, Z_{c0}$ | $X_{c1}, Y_{c1}, Z_{c1}$ | $X_{c2}, Y_{c2}, Z_{c2}$ | |
| CLASSIFICATION | UNCLASSIFIED | SPACE | TRACKING TARGET OBJECT 302 | |

FIG. 4C

| TRACKING TARGET OBJECT | IDENTIFIER OF FEATURE | THREE-DIMENSIONAL COORDINATES IN TRACKING TARGET SYSTEM |
|---|---|---|
| TRACKING TARGET OBJECT 302 | 2 | $X_{t2}, Y_{t2}, Z_{t2}$ |
| ... | | |

FIG. 4D

| IDENTIFIER OF FEATURE | 1 | ... |
|---|---|---|
| THREE-DIMENSIONAL COORDINATES IN WORLD COORDINATE SYSTEM | $X_{w1}, Y_{w1}, Z_{w1}$ | |

INFORMATION PROCESSING APPARATUS AND METHOD FOR ALIGNING CAPTURED IMAGE AND OBJECT

BACKGROUND OF THE DISCLOSURE

Field of the Disclosure

The aspect of the embodiments relates to an information processing technology for aligning a captured image and an object.

Description of the Related Art

Recent years have seen a demand for reducing the time and cost of evaluation using prototypes in the design and manufacturing field. For example, a mixed reality (MR) system for evaluating ease of assembly and maintainability using design (shape and design) data created by a computer-aided design (CAD) system has been introduced.

As an image display apparatus for the MR system, there are a video see-through type and an optical see-through type. The video see-through type image display apparatus displays a composite image by superimposing and rendering an image of a virtual space (virtual object, text information, and the like rendered using computer graphics) that is generated based on the position and orientation of an image capturing apparatus, on an image of a real space captured by the image capturing apparatus. The optical see-through type image display apparatus displays an image of a virtual space generated based on the position and orientation of a viewpoint of an observer, on an optical see-through type display mounted on the head of the observer.

One of the most important issues in an MR technology is how accurately alignment between a real space and a virtual space can be performed, and conventionally, a lot of efforts have been made. Issues of the alignment in the MR technology include an issue of obtaining the position and orientation of a camera that captures a scene, and an issue of obtaining the position and orientation of a target object (tracking target object) on which a computer graphics (CG) model is to be superimposed and displayed.

For example, in an MR system for evaluating maintainability of a machine, there is a case where a CG model of the machine is displayed as a maintenance target at a fixed position in a space, and a CG model of a tool is arranged on a tool that is a real object held by a user with the user's hand. In order to achieve this, the position and orientation of a camera coordinate system with respect to a reference coordinate system predefined in a scene and the position and orientation of a tool coordinate system with respect to the camera coordinate system on a real-time basis is obtained. Furthermore, in order to prevent the CG model of the tool from being displaced from the tool (real object), a predetermined positional relationship between the tool (real object) and the tool coordinate system is to be reproduced.

Methods of solving the issue of obtaining the position and orientation of the camera include a method of constructing a map of a real space and obtaining the position and orientation of a measurement target object based on the map. As one example thereof, there is a method called Visual Simultaneous Localization and Mapping (SLAM) (refer to G. Klein and D. Murray: "Parallel Tracking and Mapping for Small AR Workspaces", proceedings of sixth IEEE and ACM International Symposium on Mixed and Augmented Reality, 2007 (hereinafter referred to as G. Klein and D. Murray)). The Visual SLAM is a method of obtaining the position and orientation of the camera in a real space from an image captured by the camera and, at the same time, extracting keyframe information from the image as necessary to construct a map in which the information is accumulated. The keyframe information includes the image, the position and orientation of the camera that has captured the image, and three-dimensional information of a feature point extracted from the image. In order to accurately estimate the position and orientation of the camera coordinate system with respect to the reference coordinate system predefined in the scene, in one embodiment, the estimation is based on a feature point fixed in the scene (i.e., a feature point having fixed three-dimensional coordinates). Thus, information of a feature point detected from an object moving in the scene such as a tool held by the user with the user's hand is typically eliminated. Therefore, another method is used to solve the issue of obtaining the position and orientation of a moving tracking target object.

On the other hand, methods of solving the issue of obtaining the position and orientation of the target object (tracking target object) on which a CG model is to be superimposed and displayed include a method called model-based tracking (refer to J. Lima, F. Simoes, L. Figueiredo, and J. Kelner: "Model Based Markerless 3D Tracking applied to Augmented Reality", SBC Journal on 3D Interactive Systems, volume 1, 2010). The model-based tracking is a method of obtaining the position and orientation of the tracking target object in the image captured by the camera, using a three-dimensional model of the tracking target object created in advance. Specific methods thereof include a method of extracting edge information from the image captured by the camera, and applying edge information of a shape model of the tracking target object created in advance using a CAD system or a three-dimensional (3D) scanner to the extracted edge information to estimate the position and orientation of the tracking target object. Instead of using the edge information, there is a method using optical flow information or texture information. In any of the methods, a model of the tracking target object in advance using a CAD system or a 3D scanner is created.

Methods capable of obtaining the position and orientation of the camera and the position and orientation of the tracking target object using the same process include a method of performing alignment using markers (refer to H. Kato and M. Billinghurst: "Marker Tracking and hmd calibration for a video-based augmented reality conferencing system" Proceedings of 2nd IEEE and ACM International Workshop on Augmented Reality, 1999). With this method, the position and orientation of the camera can be obtained from a marker fixed at a stationary place in the scene, and the position and orientation of the tracking target object can be obtained from a marker fixed to the tracking target object. Each of the markers can be identified by an identification (ID) embedded therein.

However, with the methods described above, it is hard to say that the position and orientation of the camera and the position and orientation of the tracking target object can be acquired with high accuracy in any situation because the positions and orientations cannot be obtained if the marker goes outside a visual field of the camera, and also a preliminary preparation using a CAD system, a 3D scanner, or the like is used.

SUMMARY OF THE DISCLOSURE

According to an aspect of the embodiments, an apparatus includes an extraction unit configured to extract a plurality of pieces of feature information from an image obtained by capturing a real space including a tracking target object, an index estimation unit configured to detect an index arranged on the tracking target object from the image, and estimate a position and an orientation of the index, a target object estimation unit configured to estimate a position and an orientation of the tracking target object based on the position and the orientation of the index and a tracking target model, a classification unit configured to determine and classify the plurality of pieces of feature information based on a position and an orientation of a camera that has captured the real space and the position and the orientation of the tracking target object, and a construction unit configured to add a piece of feature information determined as belonging to the tracking target object by the classification unit, to the tracking target model.

Further features of the disclosure will become apparent from the following description of exemplary embodiments with reference to the attached drawings.

DESCRIPTION OF THE EMBODIMENTS

Exemplary embodiments will be described in detail below with reference to the accompanying drawings. The following exemplary embodiments do not necessarily limit the disclosure.

Figure 1:
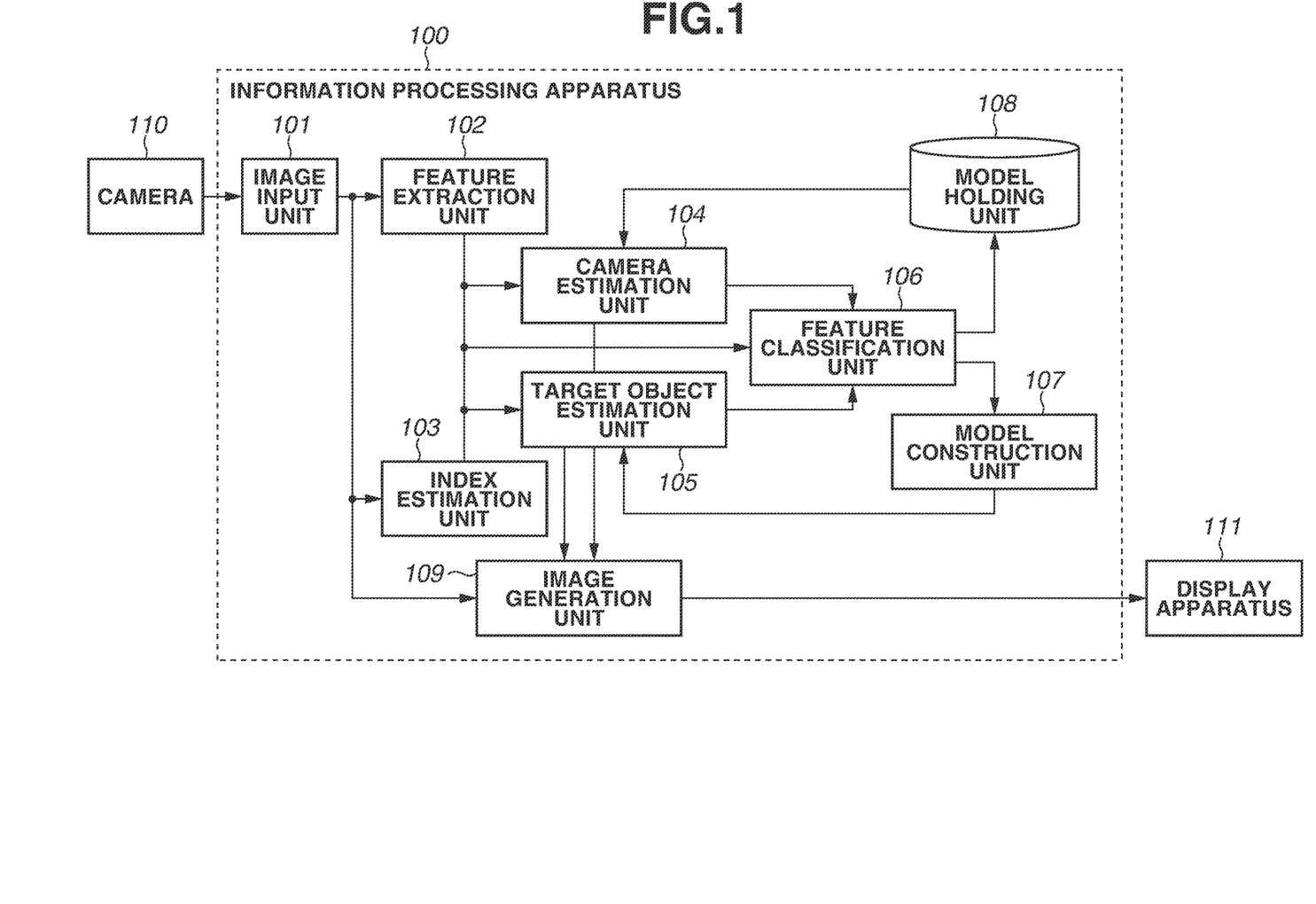
FIG. 1 is a block diagram illustrating a functional configuration example of an image processing apparatus according to a first exemplary embodiment.

FIG. 1 is a block diagram illustrating a functional configuration example of an image processing apparatus according to a first exemplary embodiment.

An information processing apparatus 100 according to the present exemplary embodiment includes an image input unit 101, a feature extraction unit 102, an index estimation unit 103, a camera estimation unit 104, a target object estimation unit 105, a feature classification unit 106, a model construction unit 107, a model holding unit 108, and an image generation unit 109. In the present exemplary embodiment, a video see-through type mixed reality (MR) system including a camera 110 for capturing a scene and a display apparatus 111 is taken as an example. Alternatively, the MR system according to the present exemplary embodiment may be an optical see-through type MR system or an eye-tracking type MR system that generates a display image based on a line-of-sight of a user.

In the present exemplary embodiment, markers and features in an image of a scene captured by the camera 110 are used to obtain the position and orientation of the camera 110 that captures the scene and the position and orientation of the target object (tracking target object) on which a computer graphics (CG) model is to be superimposed and displayed. Especially, in the present exemplary embodiment, the positions and orientations can be obtained even in a situation where the marker is outside a visual field of the camera 110, and also a method that does not require creation of a model of the tracking target object in advance using a computer-aided design (CAD) system or a three-dimensional (3D) scanner can be achieved.

While, in the present exemplary embodiment, the camera 110 is described as a stereo camera that captures images for a left eye and a right eye, the camera 110 is to be capable of measuring a depth of a pixel, and may be a depth camera, for example. In addition, the system according to the present exemplary embodiment may include, for example, one visible light camera and estimate the depth using a learning model that has undergone machine-learning. Furthermore, while the information processing apparatus 100 according to the present exemplary embodiment is described as a head-mounted type in which the camera 110 and the display apparatus 111 are arranged around the eyes of the user, a physical arrangement of each of the units is not limited thereto and the information processing apparatus 100 may be a hand-held type such as a tablet and a smartphone.

While the information processing apparatus 100 according to the present exemplary embodiment uses an image to estimate the position and orientation of the camera 110 and create a space model (map), the method for estimating the position and orientation of the camera 110 and creating a space model (map) is not limited thereto. For example, information from a sensor (e.g. an acceleration sensor, an angular velocity sensor, an ultrasonic sensor, a magnetic sensor, a depth image sensor, or a laser range sensor) may be used.

Figure 2:
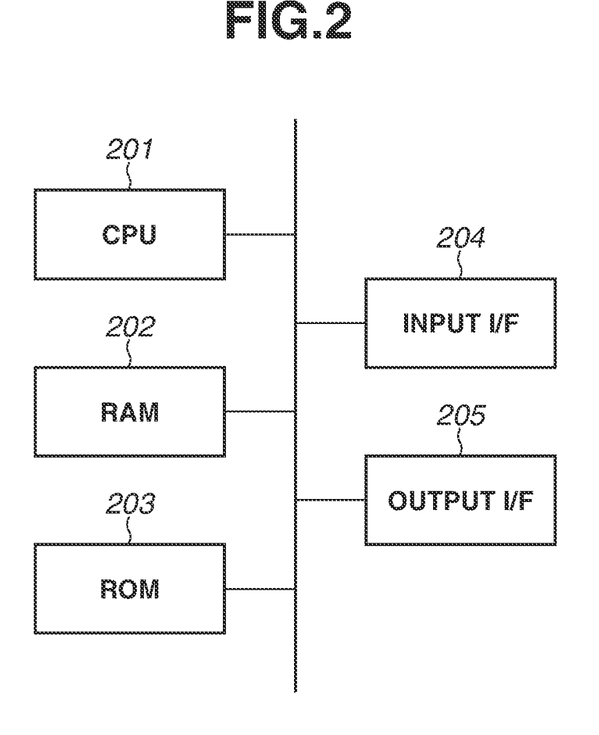
FIG. 2 is a diagram illustrating a hardware configuration example of the information processing apparatus.

FIG. 2 is a diagram illustrating a hardware configuration example of the information processing apparatus 100.

In FIG. 2, a central processing unit (CPU) 201 controls the entire information processing apparatus 100. A random-access memory (RAM) 202 is used as a work area when the CPU 201 executes processing while controlling each unit. A read-only memory (ROM) 203 stores, for example, an information processing program according to the present exemplary embodiment, various application programs, and data. The CPU 201 loads the information processing program stored in the ROM 203 to the RAM 202 and executes the program, thereby implementing the respective functions of the units including the image input unit 101, the feature extraction unit 102, the index estimation unit 103, the camera estimation unit 104, the target object estimation unit 105, the feature classification unit 106, the model construction unit 107, the image generation unit 109, and the model holding unit 108, which are illustrated in FIG. 1. An input interface (I/F) 204 inputs a signal of an image captured by the camera 110 as a signal in a format that can be processed by the information processing apparatus 100. An output I/F 205 outputs a signal to an external apparatus in a format that can be processed by the external apparatus. For example, in a case where the external apparatus is the display apparatus 111, the output I/F 205 outputs an MR image signal generated by the image generation unit 109 in a format that can be displayed on the display apparatus 111.

As described above, the function of each of the units in the information processing apparatus 100 illustrated in FIG. 1 can be implemented by the CPU 201 executing the information processing program according to the present exemplary embodiment. Alternatively, part of the units in the information processing apparatus 100 illustrated in FIG. 1 may be executed by dedicated hardware or a graphics processing unit (GPU). In this case, the dedicated hardware or the GPU operates based on control by the CPU 201.

Each of the units in the information processing apparatus 100 will be described below.

The image input unit 101 acquires an image of a real space captured by the camera 110. The camera 110 is an image capturing apparatus that can capture and record a moving image. The image input unit 101 acquires each frame image of the moving image from the camera 110. In a case where the camera 110 is configured with a plurality of image capturing apparatuses, like a stereo camera, it is assumed that the image input unit 101 acquires a plurality of frame images from the plurality of image capturing apparatuses in a synchronized manner (i.e., the image capturing times match each other).

Figure 3:
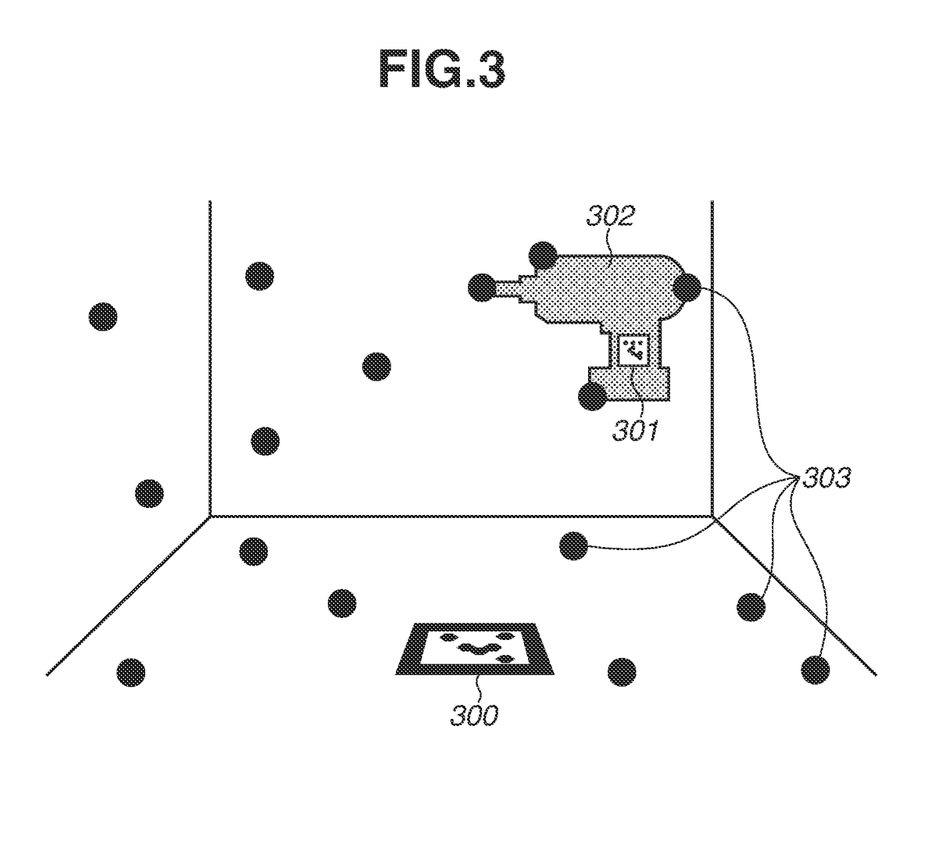
FIG. 3 is a schematic diagram illustrating an example of a real space to be captured by a camera.

As illustrated in FIG. 3, in the present exemplary embodiment, it is assumed that a target object (tracking target object 302) on which a CG model is to be superimposed and displayed is present in a real space, and at least one tracking target marker 301 has been arranged on the tracking target object 302 in advance. In the present exemplary embodiment, one tracking target object 302 is assumed to be present, but there may be a plurality of the tracking target objects 302. In this case, at least one tracking target marker 301 is arranged on each of the tracking target objects 302. In the following description, a three-dimensional coordinate system set on each tracking target marker 301 is referred to as a tracking target coordinate system.

In the present exemplary embodiment, it is assumed that at least one world coordinate system marker 300 is arranged to define a three-dimensional coordinate system (i.e., a world coordinate system) serving as a reference in a real space. However, the method for defining the three-dimensional coordinate system serving as a reference in a real space is not limited thereto. For example, the initial position and orientation of the camera 110 may be used as the reference, or a motion capture apparatus may be used.

Figure 4A:
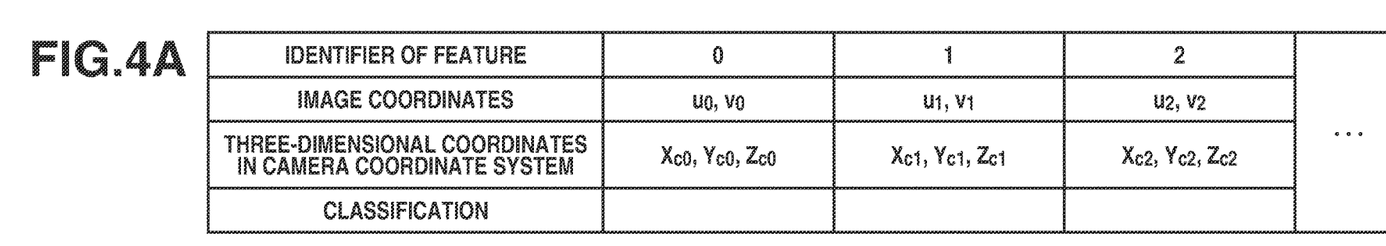
FIGS. 4A to 4D are schematic diagrams each illustrating a data structure used by the information processing apparatus.

The feature extraction unit 102 extracts feature information from an image input by the image input unit 101. The feature information extracted by the feature extraction unit 102 includes an identifier of a feature, image coordinates (two-dimensional coordinates) of the feature, and three-dimensional coordinates of the feature in a camera coordinate system, as illustrated in FIG. 4A. The feature information also includes classification information obtained in feature classification processing, which will be described below. However, the feature information is not limited to this example, and may include, for example, image information of the surroundings of the feature, a feature descriptor represented by a scale-invariant feature transform (SIFT) descriptor, and edge information. The feature extraction unit 102 transmits the feature information extracted from the image to the camera estimation unit 104 and the target object estimation unit 105.

Examples of specific methods of extracting the feature information include a method of detecting a feature point and tracking the detected feature point between frames, which is called a Kanade-Lucas-Tomasi (KLT) method. With the use of the KLT method, the feature extraction unit 102 first detects from the image a point locally determined to be a corner point as a feature point 303, as illustrated in FIG. 3. At this time, The feature extraction unit 102 detects a plurality of the feature points 303 from one image. Then, in the next frame, the feature extraction unit 102 performs a search based on the appearance of a local area around the coordinates of the feature point 303 to calculate coordinates of the feature point 303 in the new image. The KLT method can track the feature point 303 in this manner.

Because the camera 110 according to the present exemplary embodiment can measure the depth of the pixel, the feature extraction unit 102 measures the depth at the coordinates of the feature point 303, and converts the coordinates into three-dimensional coordinates in the camera coordinate system. It is assumed that parameters of the camera 110 used for this operation have been calibrated in advance.

The index estimation unit 103 detects a known index from the image input by the image input unit 101 and estimates the position and orientation of the index. In the present exemplary embodiment, the index estimation unit 103 estimates the position and orientation of the index using a visual marker and image processing. Alternatively, instead of using a visual marker, the index estimation unit 103 may use information obtained by partially modeling the tracking target object 302, or a signal detected from an environmental sensor (e.g. an optical sensor, an ultrasonic sensor, a magnetic sensor, an acceleration sensor, or an angular velocity sensor) as an index to measure the position and orientation of the index.

The visual marker allows identifying the identification (ID) of the maker and estimating the position and orientation of the marker based on how the marker appears in the image. In the present exemplary embodiment, it is assumed that the world coordinate system marker 300 and the tracking target marker 301 illustrated in FIG. 3 have been registered in advance as known indexes.

For each of the world coordinate system marker 300 and the tracking target marker 301, the index estimation unit 103 determines, based on the input image, the ID of the marker, whether the marker has been detected, and information of the position and orientation of the marker. The index estimation unit 103 then transmits information of the world coordinate system marker 300 to the camera estimation unit 104, and transmits information of the tracking target marker 301 to the target object estimation unit 105. In a case where a plurality of the tracking target markers 301 is present, the index estimation unit 103 transmits the respective pieces of information thereof to the target object estimation unit 105.

The camera estimation unit 104 estimates the position and orientation of the camera 110 in the image input from the image input unit 101, by using the information transmitted from the feature extraction unit 102 and the information of the world coordinate system marker 300 transmitted from the index estimation unit 103. In the present exemplary embodiment, an example will be described in which the camera estimation unit 104 uses an algorithm for estimating the position and orientation of the camera 110 with the combined use of the visual marker information and the Visual SLAM. However, the method for estimating the position and orientation of the camera 110 is not limited thereto, and may be a method using another algorithm or an external sensor.

A specific example of the algorithm for estimating the position and orientation of the camera 110, which is used by the camera estimation unit 104, will be described below.

The camera estimation unit 104 first estimates the position and orientation of the camera 110 using the visual marker. If the world coordinate system marker 300 has been detected by the index estimation unit 103, the camera estimation unit 104 acquires the position and orientation of the camera 110 in the world coordinate system based on the world coordinate system marker 300.

Next, the camera estimation unit 104 uses the feature information transmitted from the feature extraction unit 102 to estimate three-dimensional coordinates of the feature information in the world coordinate system. Here, if information of a space model (map) corresponding to the feature information is held by the model holding unit 108, the camera estimation unit 104 refers to the information. Otherwise, the camera estimation unit 104 obtains the three-dimensional coordinates of the feature information in the world coordinate system, based on the three-dimensional coordinates in the camera coordinate system included in the feature information and the information of the position and orientation of the camera 110 obtained based on the world coordinate system marker 300.

The camera estimation unit 104 obtains the position and orientation of the camera 110 with six degrees of freedom by solving simultaneous equations called a Perspective-n-Point (PnP) problem based on a correspondence between the three-dimensional coordinates of the feature point 303 in the world coordinate system and the image coordinates of the feature point 303. Internal parameters of the camera 110 are used to solve the PnP problem is assumed to have been obtained in advance. If a solution to the PnP problem can be acquired, the camera estimation unit 104 updates the position and orientation of the camera 110.

The target object estimation unit 105 estimates the position and orientation of the tracking target object 302 in the image input from the image input unit 101, by using the information transmitted from the feature extraction unit 102 and the information of the tracking target marker 301 transmitted from the index estimation unit 103. Here, if feature information belonging to the tracking target object 302 is held in processing by the model construction unit 107, which will be described below, the target object estimation unit 105 refers to the information.

In the present exemplary embodiment, it is assumed that the position and orientation of the tracking target object 302 are represented by the position and orientation of the tracking target marker 301. More specifically, the issue of obtaining the position and orientation of the tracking target object 302 results in an issue of obtaining the position and orientation of the tracking target coordinate system with respect to the world coordinate system. In the present exemplary embodiment, because the position and orientation of the camera coordinate system with respect to the world coordinate system has already been known by the camera estimation unit 104, the issue of obtaining the position and orientation of the tracking target object 302 will be described as the issue of obtaining the position and orientation of the tracking target coordinate system with respect to the camera coordinate system.

Steps of processing for obtaining the position and orientation of the tracking target coordinate system with respect to the camera coordinate system will be described below.

First, if the tracking target marker 301 has been detected by the index estimation unit 103, the position and orientation of the tracking target coordinate system with respect to the camera coordinate system (referred to as the initial position and orientation) can be acquired. When feature information is not held by the model construction unit 107, the target object estimation unit 105 determines the initial position and orientation as the position and orientation of the tracking target coordinate system, and ends the processing for estimating the position and orientation of the tracking target object 302.

If feature information is held by the model construction unit 107, the target object estimation unit 105 obtains a more stable position and orientation of the tracking target object 302 using the feature information. More specifically, the target object estimation unit 105 first associates the feature information held by the model construction unit 107 (hereinafter referred to as the held feature information) and the feature information extracted by the feature extraction unit 102 (hereinafter referred to as the feature information of the current frame).

Examples of the method for associating these pieces of feature information include a method using projected coordinates of the held feature information. With this method, the target object estimation unit 105 first projects three-dimensional coordinates of the held feature information in the tracking target coordinate system onto the current frame image using the initial position and orientation to acquire the projected coordinates. The target object estimation unit 105 then associates a piece of feature information having the image coordinates nearest to the projected coordinates, among pieces of feature information of the current frame, with the held feature information.

If the tracking target marker 301 is not detected and the initial position and orientation cannot be acquired, the target object estimation unit 105 may set, as the initial position and orientation, the position and orientation of the tracking target coordinate system in the current frame, which is predicted from the past motion. Alternatively, the target object estimation unit 105 may associate the feature information of the current frame with the held feature information using a method, such as the KLT method, that acquires a correspondence between pieces of feature information of frames using image information, based on a correspondence between the held feature information and the feature information of the past frame. However, the method for acquiring the correspondence between the pieces of feature information is not limited thereto. For example, the correspondence may be acquired by using the image information of the surroundings of the feature and the surroundings of the projected coordinates, the degree of similarity of feature descriptors, or the edge information of the surroundings of the feature information.

After acquiring the correspondence between the held feature information and the feature information of the current frame using any of the methods described above, the target object estimation unit 105 obtains the position and orientation of the tracking target coordinate system by using the feature information of the current frame associated with the held feature information. The position and orientation of the tracking target coordinate system can be obtained by solving the PnP problem using the three-dimensional coordinates of the held feature information in the tracking target coordinate system and the image coordinates of the feature information of the current frame. However, the method for obtaining the position and orientation of the tracking target coordinate system is not limited thereto. For example, the position and orientation of the tracking target coordinate system may be obtained in such a manner to minimize point-to-point distances between a group of points of the three-dimensional coordinates of the held feature information in the tracking target coordinate system and a group of points of the feature information of the current frame in the world coordinate system.

Figure 4B:
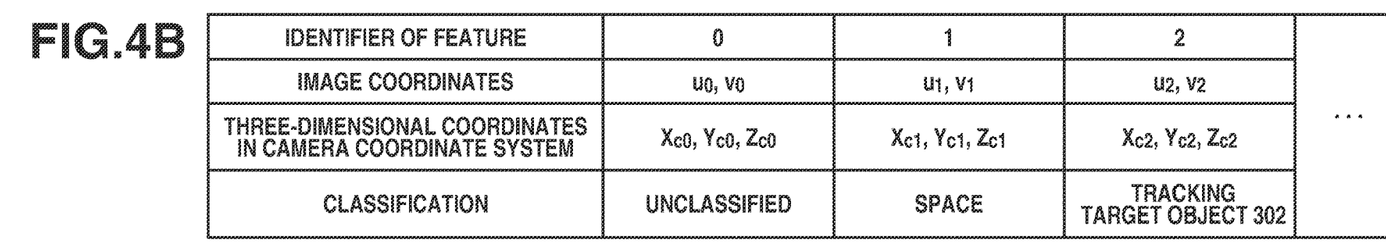

The feature classification unit 106 classifies the feature information extracted by the feature extraction unit 102, using the information transmitted from the camera estimation unit 104 and the information transmitted from the target object estimation unit 105, as illustrated in FIG. 4B.

The feature classification unit 106 first projects the three-dimensional coordinates in the camera coordinate system included in the feature information, onto the world coordinate system. If the three-dimensional coordinates in the world coordinate system are constant over a plurality of frames, the feature classification unit 106 classifies the feature information as belonging to the space. If not, the feature classification unit 106 projects the three-dimensional coordinates in the camera coordinate system included in the feature information, onto the tracking target coordinate system. If the three-dimensional coordinates in the tracking target coordinate system are constant over the plurality of frames, the feature classification unit 106 classifies the feature information as belonging to the tracking target object 302 having the tracking target coordinate system.

The feature classification unit 106 transmits the feature information classified as belonging to the tracking target object 302, to the model construction unit 107, and transmits the feature information classified as belonging to the space, to the model holding unit 108.

Figure 5:
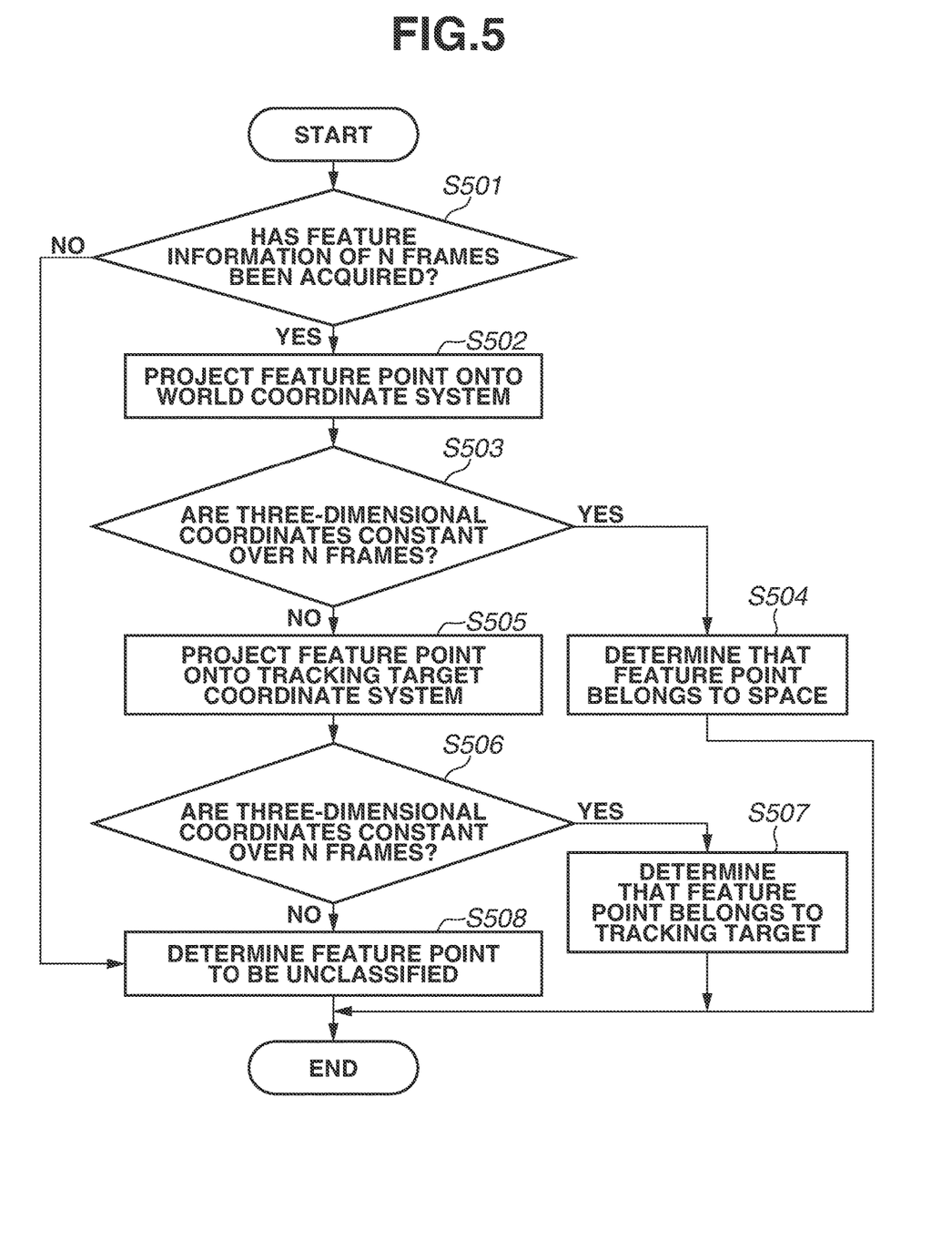
FIG. 5 is a flowchart illustrating a flow of feature classification processing.

FIG. 5 is a flowchart illustrating an example of a specific method of classification performed by the feature classification unit 106.

First, in step S501, the feature classification unit 106 determines whether feature information of N frames (N is an integer of 2 or more) has been acquired for the feature point 303 that is the target of determination. If the feature classification unit 106 determines that the feature information of N frames has been acquired (YES in step S501), the processing proceeds to step S502. If the feature classification unit 106 determines that the feature information of N frames has not been acquired (NO in step S501), the processing proceeds to step S508. In step S508, the feature classification unit 106 determines the feature point 303 to be unclassified, and ends the processing.

In step S502, the feature classification unit 106 acquires the three-dimensional coordinates of the feature point 303 in the world coordinate system by using the feature information that is the target of classification. More specifically, the feature classification unit 106 acquires the three-dimensional coordinates in the world coordinate system by converting the three-dimensional coordinates in the camera coordinate system included in the feature information into the three-dimensional coordinates in the world coordinate system by using the position and orientation of the camera 110 estimated by the camera estimation unit 104.

In step S503, the feature classification unit 106 determines whether the three-dimensional coordinates of the feature point 303 in the world coordinate system acquired in step S502 are constant over N frames. More specifically, the feature classification unit 106 obtains average coordinates of the three-dimensional coordinates in N frames, and performs the determination based on whether distances between the average coordinates and the respective three-dimensional coordinates are equal to or less than a certain value. However, the determination method is not limited thereto. If the feature classification unit 106 determines that the three-dimensional coordinates of the feature point 303 in the world coordinate system are constant over N frames (YES in step S503), the processing proceeds to step S504. In step S504, the feature classification unit 106 determines the feature point 303 as belonging to the space, and ends the processing. If not (NO in step S503), the processing proceeds to step S505.

In step S505, the feature classification unit 106 acquires the three-dimensional coordinates in the tracking target coordinate system by using the feature information that is the target of classification. More specifically, the feature classification unit 106 acquires the three-dimensional coordinates in the tracking target coordinate system by converting the three-dimensional coordinates in the camera coordinate system included in the feature information into the three-dimensional coordinates in the tracking target coordinate system by using the position and orientation of the tracking target coordinate system with respect to the camera coordinate system estimated by the target object estimation unit 105.

Then, in step S506, the feature classification unit 106 determines whether the three-dimensional coordinates of the feature point 303 in the tracking target coordinate system acquired in step S505 are constant over N frames. A specific determination method is similar to that in step S503. If the feature classification unit 106 determines that the three-dimensional coordinates of the feature point 303 in the tracking target coordinate system are constant over N frames (YES in step S506), the processing proceeds to step S507. In step S507, the feature classification unit 106 determines the feature point 303 as belonging to the tracking target object 302, and ends the processing. If not (NO in step S506), the processing proceeds to step S508. In step S508, the feature classification unit 106 determines the feature point 303 to be unclassified, and ends the processing. In a case where a plurality of the tracking target objects 302 is present, the feature classification unit 106 executes the processing in step S505 and the processing in step S506 for each of the tracking target objects 302.

Figure 4C:
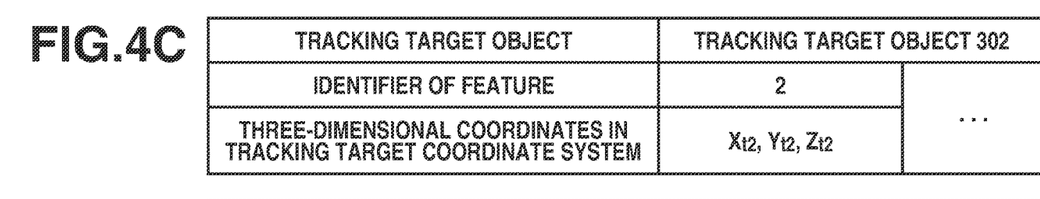

The model construction unit 107 constructs a tracking target model by accumulating information based on the feature point determined as belonging to the tracking target object 302 by the feature classification unit 106 on a tracking target object-by-tracking target object basis. FIG. 4C illustrates an example of the information held by the model construction unit 107. More specifically, the model construction unit 107 records the identifier of a feature determined as belonging to the tracking target object 302 by the feature classification unit 106, as illustrated in FIG. 4C. Furthermore, the model construction unit 107 converts the three-dimensional coordinates of the feature in the camera coordinate system into the three-dimensional coordinates of the tracking target object 302 in the tracking target coordinate system, and records the three-dimensional coordinates. If three-dimensional coordinates of the feature in the tracking target coordinate system have been acquired from a plurality of frames, the model construction unit 107 may record the three-dimensional coordinates by combining the results thereof. However, the combination method is not specifically limited.

Figure 4D:
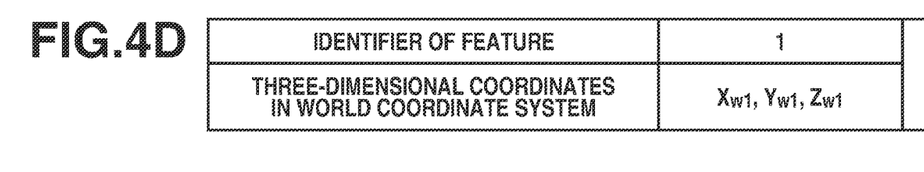

For the feature information determined as belonging to the space by the feature classification unit 106, the model holding unit 108 calculates and holds the three-dimensional coordinates in the world coordinate system. At this time, the model holding unit 108 uses the information obtained by the camera estimation unit 104. FIG. 4D illustrates an example of the information held by the model holding unit 108. More specifically, the model holding unit 108 holds information about the identifier of the feature and information about the three-dimensional coordinates in the world coordinate system, as illustrated in FIG. 4D. The issue of obtaining the three-dimensional coordinates of the feature in the world coordinate system with high accuracy has been tackled by various Visual Simultaneous Localization and Mapping (SLAM) techniques including the technique discussed by G. Klein and D. Murray, and the method thereof is not specifically limited in the disclosure.

The image generation unit 109 generates a virtual image using the position and orientation of the camera 110 estimated by the camera estimation unit 104, and the position and orientation of the tracking target object 302 estimated by the target object estimation unit 105. The image generation unit 109 then generates an MR image by synthesizing the generated virtual image with the image input from the image input unit 101, and outputs the MR image as signals that can be displayed on the display apparatus 111.

Here, a work simulation system will be described as an example where a CG model of a machine is superimposed and displayed as a work target at a fixed position in a real space, and a CG model of a tool is superimposed and displayed on a tool that is a real object (tracking target object 302) held by the user with the user's hand.

The image generation unit 109 first generates a virtual image in which the CG model of the machine (work target) is present at the fixed position in the real space, by reflecting the position and orientation of the camera coordinate system with respect to the world coordinate system, which has been estimated by the camera estimation unit 104, in a virtual camera. The image generation unit 109 further generates a virtual image in which the CG model of the tool is present on the tool (tracking target object 302) held by the user with the user's hand, by reflecting the position and orientation of the tracking target coordinate system with respect to the world coordinate system, which has been estimated by the target object estimation unit 105, in the position and orientation of the CG model.

An index such as the visual marker may be difficult to be arranged on the tool (tracking target object 302) held by the user with the user's hand due to a reason such as the sharp-pointed tip of the tool, and may be arranged, for example, in the proximity of the handle of the tool. In addition, when the position and orientation of the tracking target object 302 is obtained using the visual marker, if the user comes closer to look carefully at the tip of the tool, the visual marker becomes outside an observation area of the camera 110, and thus the position and orientation of the tracking target object 302 cannot be obtained. As a result, the CG model of the tool cannot be displayed at a correct position, which may hinder the implementation of a work simulation.

In contrast, the method according to the present exemplary embodiment enables the feature information of the tip of the tool to be held in the model construction unit 107 while the visual marker and the tip of the tool are within the observation area of the camera 110. Thus, even if the visual marker cannot be detected thereafter, the position and orientation of the tracking target object 302 can be obtained based on the feature information of the tip of the tool. The method according to the present exemplary embodiment can thereby achieve the work simulation system that allows the user to work while closely observing the tip of the tool.

Figure 6:
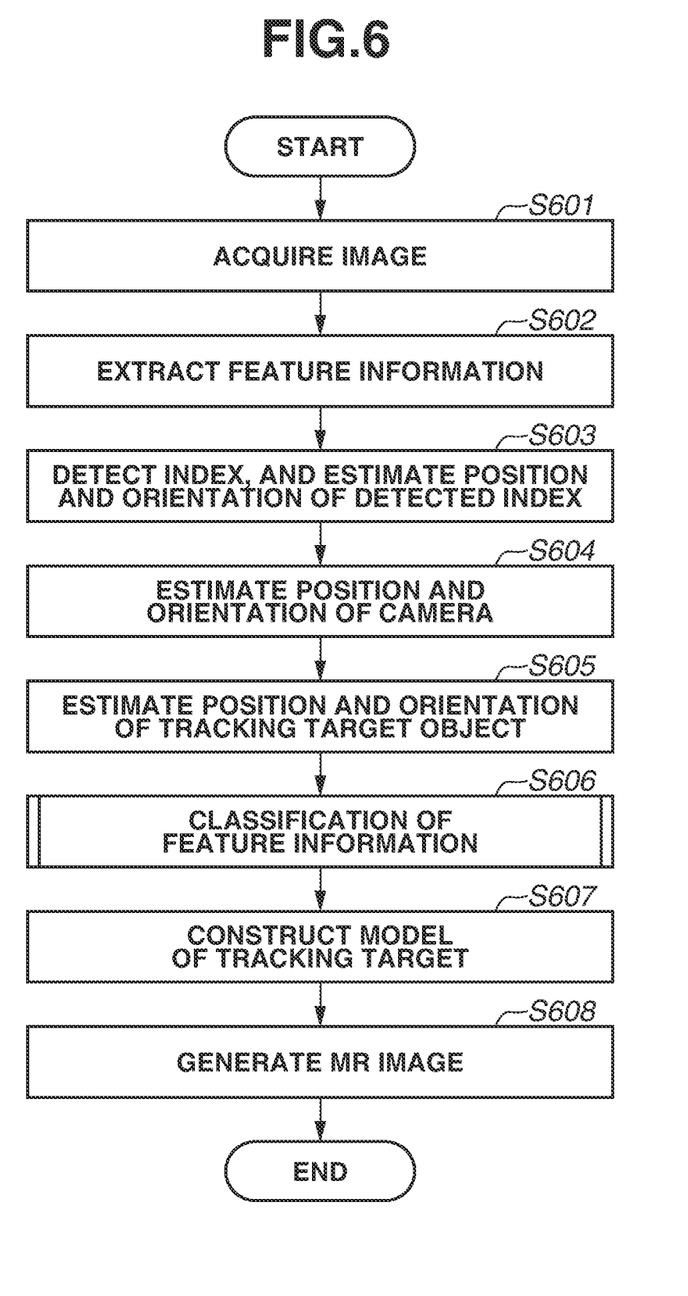
FIG. 6 is a flowchart illustrating a flow of information processing performed by the image processing apparatus.

FIG. 6 is a flowchart illustrating the flow of processing for generating an MR image, which is executed by the information processing apparatus 100 according to the present exemplary embodiment.

In step S601, the image input unit 101 first acquires an image. More specifically, the image input unit 101 imports the image of the real space captured by the camera 110 through the input I/F 204.

Next, in step S602, the feature extraction unit 102 extracts feature information from the image acquired by the image input unit 101 in step S601.

Then, in step S603, the index estimation unit 103 detects an index from the image of the real space acquired by the image input unit 101 in step S601, and estimates the position and orientation of each index.

In step S604, the camera estimation unit 104 estimates the position and orientation of the camera 110. More specifically, the camera estimation unit 104 estimates the position and orientation of the camera 110 based on the image of the real space acquired in step S601, the feature information extracted in step S602, and the position and orientation of the index estimated in step S603.

In step S605, the target object estimation unit 105 estimates the position and orientation of the tracking target object 302. More specifically, the target object estimation unit 105 estimates the position and orientation of the tracking target object 302 based on the image of the real space acquired in step S601, the feature information extracted in step S602, and the position and orientation of the index estimated in step S603.

In step S606, the feature classification unit 106 executes the classification processing of the feature information as described with reference to FIG. 5. More specifically, the feature classification unit 106 classifies the feature information based on the feature information extracted in step S602, the position and orientation of the camera 110 estimated in step S604, and the position and orientation of the tracking target object 302 estimated in step S605.

In step S607, the model construction unit 107 constructs a model of the tracking target object 302 (tracking target model) by converting the three-dimensional coordinates of the feature information into the coordinates in the tracking target coordinate system and holding the coordinates.

In step S608, the image generation unit 109 generates an MR image. Then, the processing in the flowchart illustrated in FIG. 6 ends.

Next, a first modification example will be described. The feature classification unit 106 according to the first exemplary embodiment uses the three-dimensional coordinates of the feature point 303 being constant over a plurality of frames, as the criterion for the classification. However, the three-dimensional coordinates of the feature point 303 that can be measured from an image may have an error in a depth direction of the image. Thus, as a determination method that is less susceptible to the error in the depth direction, the feature classification unit 106 projects the three-dimensional coordinates in the tracking target coordinate system onto the image by using the position and orientation of the camera 110 in the tracking target coordinate system, and uses an error (reprojection error) between the projected coordinates and the detected coordinates of the feature point 303.

More specifically, if the reprojection error in the tracking target coordinate system is equal to or less than a predetermined threshold over N frames (YES in step S506), then in step S507, the feature classification unit 106 determines the feature point 303 as belonging to the tracking target object 302, and ends the processing.

Similarly, if the reprojection error in the world coordinate system is equal to or less than a predetermined threshold over N frames (YES in step S503), then in step S504, the feature classification unit 106 determines the feature point 303 as belonging to the space, and ends the processing.

In the first exemplary embodiment, the camera 110 has been described as being capable of measuring the depth of the pixel. In addition, in the first exemplary embodiment, information of the depth of the pixel is used to calculate the three-dimensional coordinates of the feature point 303 in the camera coordinate system. Furthermore, in the first exemplary embodiment, the information of the three-dimensional coordinates of the feature point 303 is used by the camera estimation unit 104, the target object estimation unit 105, and the feature classification unit 106. The processing by the camera estimation unit 104 is not limited to the method described in the first exemplary embodiment, and the method may be substituted by a Visual SLAM technique using a monocular camera. In a second exemplary embodiment, an example of a case where the camera 110 cannot obtain the depth of the pixel from one frame image, like a monocular camera, will be described. A configuration of the information processing apparatus 100 according to the second exemplary embodiment is similar to that described above with reference to FIGS. 1 and 2, and thus the illustration and description thereof will be omitted. The configuration and operation in the second exemplary embodiment different from those in the first exemplary embodiment will be described below.

In the second exemplary embodiment, the target object estimation unit 105 has three-dimensional coordinates of a feature point that is held by the model construction unit 107. Thus, processing by the target object estimation unit 105 according to the present exemplary embodiment can be the same as that according to the first exemplary embodiment.

As is the case in the present exemplary embodiment, a motion stereo method is used as a method of obtaining the three-dimensional coordinates of a feature point from the image coordinates thereof by using a monocular camera. The motion stereo method can obtain three-dimensional coordinates of a point X in a case where image coordinates of the point X in a space have been acquired from a plurality of frames captured by the camera 110 and the position and orientation of the camera 110 in each frame with respect to a certain coordinate system C have been obtained.

The specific example thereof will be described with reference to FIGS. 7A and 7B. Triangular marks 702 illustrated in FIGS. 7A and 7B represent positions and orientations of the camera 110 with respect to the tracking target marker 301 at different times (in different frames).

Figure 7A:
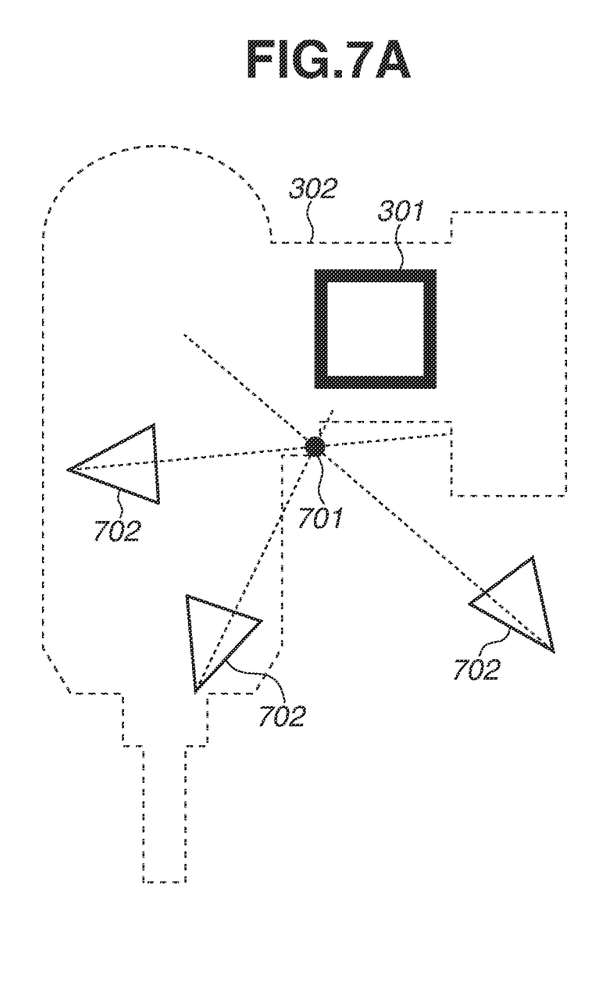
FIGS. 7A and 7B are schematic diagrams used to describe classification processing according to a second exemplary embodiment.

In a case where a point on the tracking target object 302 is detected as a feature point 701, as illustrated in FIG. 7A, the feature point 701 is at a fixed position in the tracking target coordinate system. Thus, rays that pass through the feature point 701 (rays of light in the three-dimensional space emitted from the optical center of the camera 110 and passing through the image coordinates of the feature point 701) in the respective frames intersect at one point, and coordinates of the intersection serve as three-dimensional coordinates of the feature point 701 in the tracking target coordinate system.

Figure 7B:
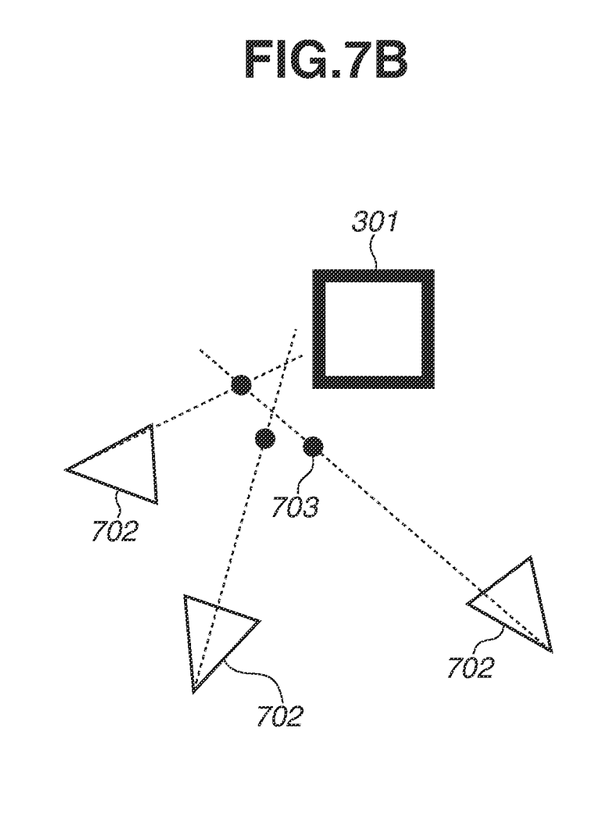

On the other hand, in a case of a feature point 703 that is not at a fixed position in the tracking target coordinate system as illustrated in FIG. 7B, rays that pass through the respective feature points 703 in the respective frames do not intersect at one point. As a result, it can be determined that the feature point 703 is on an object other than the tracking target object 302.

In the present exemplary embodiment, by utilizing this property, the processing by the feature classification unit 106 in the flowchart illustrated in FIG. 5 is as follows.

In the present exemplary embodiment, in step S505, the feature classification unit 106 calculates rays in the tracking target coordinate system based on the position and orientation of the camera 110 in the tracking target coordinate system and the image coordinates of a feature point.

Next, in step S506, the feature classification unit 106 determines whether the rays in N frames intersect with one another. If the feature classification unit 106 determines that the rays intersect with one another (YES in step S506), the processing proceeds to step S507. In step S507, the feature classification unit 106 determines the feature point 701 as belonging to the tracking target object 302, and ends the processing. If not (NO in step S506), the processing proceeds to step S508. In step S508, the feature classification unit 106 determines the feature point 703 to be unclassified, and ends the processing. In a case where a plurality of the tracking target objects 302 is present, the feature classification unit 106 executes the processing in step S505 and the processing in step S506 for each of the tracking target objects 302.

In the present exemplary embodiment, the feature classification unit 106 can determine whether the feature point 701 belongs to the space, using a similar method based on the position and orientation of the camera 110 in the world coordinate system. In step S502, the feature classification unit 106 calculates rays in the world coordinate system based on the position and orientation of the camera 110 in the world coordinate system and the image coordinates of a feature point. Next, in step S503, the feature classification unit 106 determines whether the rays in N frames intersect with one another. If the rays intersect with one another (YES in step S503), the processing proceeds to step S504. In step S504, the feature classification unit 106 determines the feature point 701 as belonging to the space, and ends the processing. If not (NO in step S503), the processing proceeds to step S505.

Next, a second modification example will be described. In the first and second exemplary embodiments, there may be a case where the target object (tracking target object 302) on which a CG model is to be superimposed and displayed is grabbed and moved by a person with the person's hand. In this case, the motion of the hand of the person matches that of the tracking target object 302, and thus there is a possibility that the feature information detected from the hand of the person may be classified as the feature information belonging to the tracking target object 302 by the feature classification unit 106. In order to avoid this, the feature classification unit 106 may estimate an area such as a human body in the image input from the image input unit 101, which is to be determined as not being the tracking target object 302, as a mask area and determine the feature information in the mask area as a point not belonging to the space or the tracking target object 302. Specific methods of estimating the mask area include a method of setting an area in which a color of each pixel matches flesh color information registered in advance, as the mask area. The method of estimating the mask area is not limited to this example.

Next, a third modification example will be described. An item of probability of classification may be added to the above-described feature information illustrated in FIGS. 4A and 4B in the first and second exemplary embodiments. It can be considered that the more the same determination is repeated on certain feature information by the feature classification unit 106, the higher the probability of the classification is. Thus, the feature classification unit 106 may calculate a value based on the number of the repetitions, and record the value in the item of the probability of the classification.

The specific example thereof will be described. In the first and second exemplary embodiments, the feature classification unit 106 executes classification by checking the three-dimensional coordinates, the reprojection error, or the intersection of the rays over N frames. In a case where the number of N (i.e., the number of images) is small, erroneous determination due to the influence of an error in feature information extraction or an error in position and orientation detection is likely to occur. On the other hand, the larger the number of N (number of images) is, the higher the probability of the classification is, but the determination cannot be made until data of N frames is acquired, so that the classification of the feature information requires time.

Considering the above issue, the feature classification unit 106 counts the number of images over which the three-dimensional coordinates are constant, the reprojection error is equal to or less than the threshold, or the rays intersect at the same point, and records the probability of the classification based on the number of images. With this method, a temporary classification result can be acquired when the number of frames is small, and a classification result with higher accuracy can be acquired over time.

As described above, the information processing apparatus 100 according to each of the exemplary embodiments can achieve the MR system that does not require a preliminary preparation other than the arrangement of the markers and is capable of estimating the position and orientation of the camera 110 and the position and orientation of the tracking target object 302 with high accuracy.

While the exemplary embodiments of the disclosure have been described above, the disclosure is not limited to the particular exemplary embodiments, and includes various embodiments without departing from the gist of the disclosure. Part of the exemplary embodiments described above can be combined as appropriate.

In the configuration described above with reference to FIG. 1, each unit other than the image input unit 101 and the model holding unit 108, for example, may execute processing by applying artificial intelligence (AI). For example, a machine-learned model may be used in substitution for these units. In this case, a plurality of combinations of input data and output data to and from these units is prepared as learned data, and the learned model, which acquires knowledge from the pieces of data by machine-learning and outputs data corresponding to input data as a result based on the acquired knowledge, is generated. The learned model can be configured using a neural network model, for example. The learned model, which serves as a program for executing processing in a similar manner to the above-described units, executes the processing of the respective units in collaboration with the CPU 201, the GPU, or the like. Furthermore, the learned model described above can be updated every time a certain amount of data is processed, as necessary.

The above-described exemplary embodiments of the disclosure can also be achieved by processing in which a program that implements one or more functions according to the exemplary embodiments is supplied to a system or an apparatus through a network or a storage medium, and is read and executed by one or more processors in a computer in the system or the apparatus. Furthermore, the exemplary embodiments can be achieved by a circuit (e.g., Application Specific Integrated Circuit (ASIC)) that implements one or more functions.

The exemplary embodiments described above are merely concrete examples of implementing the disclosure, and the technical scope of the disclosure should not be interpreted in a limited manner by the exemplary embodiments. The disclosure can be implemented in various modes without departing from the technical idea or the principal features of the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-185352, filed Oct. 8, 2019, which is hereby incorporated by reference herein in its entirety.

What is claimed is:

1. An apparatus comprising:
an extraction unit configured to extract a plurality of pieces of feature information from an image obtained by capturing a real space including a tracking target object;
an index estimation unit configured to detect an index arranged on the tracking target object from the image, and estimate a position and an orientation of the index;
a target object estimation unit configured to estimate a position and an orientation of the tracking target object based on the position and the orientation of the index and a tracking target model;
a classification unit configured to determine and classify the plurality of pieces of feature information based on a position and an orientation of a camera that has captured the real space and the position and the orientation of the tracking target object; and
a construction unit configured to add a piece of feature information determined as belonging to the tracking target object by the classification unit, to the tracking target model,
wherein the image includes depth information,
wherein each of the plurality of pieces of feature information includes first three-dimensional coordinates of a corresponding one of a plurality of features in the image of the real space, the first three-dimensional coordinates being expressed in a coordinate system of the camera, and
wherein the classification unit is configured to calculate, for a piece of feature information being a target of the determination among the plurality of pieces of feature information, second three-dimensional coordinates by projecting the first three-dimensional coordinates onto a three-dimensional coordinate system that uses the position and the orientation of the index as a reference, and further determine, if the second three-dimensional coordinates are constant over two or more images of the real space captured at different times, that the piece of feature information being the target of the determination belongs to the tracking target object.

2. The apparatus according to claim 1, wherein the depth information is obtained by measurement by a stereo camera or a depth camera, or by depth estimation by one visible light camera using a learning model that has undergone machine-learning.

3. An apparatus comprising:
   an extraction unit configured to extract a plurality of pieces of feature information from an image obtained by capturing a real space including a tracking target object;
   an index estimation unit configured to detect an index arranged on the tracking target object from the image, and estimate a position and an orientation of the index;
   a target object estimation unit configured to estimate a position and an orientation of the tracking target object based on the position and the orientation of the index and a tracking target model;
   a classification unit configured to determine and classify the plurality of pieces of feature information based on a position and an orientation of a camera that has captured the real space and the position and the orientation of the tracking target object; and
   a construction unit configured to add a piece of feature information determined as belonging to the tracking target object by the classification unit, to the tracking target model,
   wherein each of the plurality of pieces of feature information includes image coordinates of a corresponding one of a plurality of features in the image of the real space, and first three-dimensional coordinates of the corresponding one of the plurality of features in the image of the real space, the first three-dimensional coordinates being expressed in a coordinate system of the camera, and
   wherein the classification unit is configured to calculate, for a piece of feature information being a target of the determination among the plurality of pieces of feature information, a reprojection error that is an error between coordinates obtained by projecting second three-dimensional coordinates onto the image of the real space and the image coordinates, the second three-dimensional coordinates being calculated by projecting the first three-dimensional coordinates onto a three-dimensional coordinate system that uses the position and the orientation of the index as a reference, and further determine, if the reprojection error is equal to or less than a threshold over two or more images of the real space captured at different times, that the piece of feature information being the target of the determination belongs to the tracking target object.

4. An apparatus comprising:
   an extraction unit configured to extract a plurality of pieces of feature information from an image obtained by capturing a real space including a tracking target object;
   an index estimation unit configured to detect an index arranged on the tracking target object from the image, and estimate a position and an orientation of the index;
   a target object estimation unit configured to estimate a position and an orientation of the tracking target object based on the position and the orientation of the index and a tracking target model;
   a classification unit configured to determine and classify the plurality of pieces of feature information based on a position and an orientation of a camera that has captured the real space and the position and the orientation of the tracking target object; and
   a construction unit configured to add a piece of feature information determined as belonging to the tracking target object by the classification unit, to the tracking target model,
   wherein each of the plurality of pieces of feature information includes a first ray of light of a corresponding one of a plurality of features in the image of the real space,
   wherein the first ray of light is emitted from an optical center of the camera that has captured the real space, and passes through image coordinates of the corresponding one of the plurality of features in the image of the real space,
   wherein the classification unit is configured to calculate, for a piece of feature information being a target of the determination among the plurality of pieces of feature information, a second ray of light by projecting the first ray of light onto a three-dimensional coordinate system that uses the position and the orientation of the index as a reference, and further determine, if a plurality of the second rays of light in two or more images of the real space captured at different times intersects, that the piece of feature information being the target of the determination belongs to the tracking target object, and
   wherein the construction unit is configured to accumulate three-dimensional coordinates of a point at which the plurality of the second rays of light intersects, in the tracking target model.

5. The apparatus according to claim 1, wherein the classification unit is configured to estimate an area to be determined as not being the tracking target object, in the image of the real space, as a mask area, and determine that a piece of feature information in the mask area among the plurality of pieces of feature information does not belong to the tracking target object.

6. The apparatus according to claim 1, wherein the classification unit is configured to calculate a probability that the piece of feature information belongs to the tracking target object based on a number of images over which the second three-dimensional coordinates are constant, among the two or more images of the real space captured at different times, and include the calculated probability in the piece of feature information.

7. The apparatus according to claim 3, wherein the classification unit is configured to calculate a probability that the piece of feature information belongs to the tracking target object based on a number of images over which the reprojection error is equal to or less than the threshold, among the two or more images of the real space captured at different times, and include the calculated probability in the piece of feature information.

8. The apparatus according to claim 4, wherein the classification unit is configured to calculate a probability that the piece of feature information belongs to the tracking target object based on a number of images over which the plurality of the second rays of light intersects at an identical point, among the two or more images of the real space captured at different times, and include the calculated probability in the piece of feature information.

9. The apparatus according to claim 1, wherein the index estimation unit is configured to use information obtained by partially modeling the tracking target object, as the index arranged on the tracking target object.

10. A method comprising:
extracting a plurality of pieces of feature information from an image obtained by capturing a real space including a tracking target object;
detecting an index arranged on the tracking target object from the image, and estimating a position and an orientation of the index;
estimating a position and an orientation of the tracking target object based on the position and the orientation of the index and a tracking target model;
determining and classifying the plurality of pieces of feature information based on a position and an orientation of a camera that has captured the real space and the position and the orientation of the tracking target object; and
adding a piece of feature information determined as belonging to the tracking target object by the classification, to the tracking target model;
calculating, for a piece of feature information being a target of the determination among the plurality of pieces of feature information, second three-dimensional coordinates by projecting first three-dimensional coordinates onto a three-dimensional coordinate system that uses the position and the orientation of the index as a reference; and
determining, if the second three-dimensional coordinates are constant over two or more images of the real space captured at different times, that the piece of feature information being the target of the determination belongs to the tracking target object,
wherein the image includes depth information, and
wherein each of the plurality of pieces of feature information includes the first three-dimensional coordinates of a corresponding one of a plurality of features in the image of the real space, the first three-dimensional coordinates being expressed in a coordinate system of the camera.

11. The method according to claim 10, further comprising:
estimating an area to be determined as not being the tracking target object, in the image of the real space, as a mask area; and
determining that a piece of feature information in the mask area among the plurality of pieces of feature information does not belong to the tracking target object.

12. The method according to claim 10, further comprising using information obtained by partially modeling the tracking target object, as the index arranged on the tracking target object.

13. A non-transitory computer-readable storage medium storing a program that causes a computer to function as:
an extraction unit configured to extract a plurality of pieces of feature information from an image obtained by capturing a real space including a tracking target object;
an index estimation unit configured to detect an index arranged on the tracking target object from the image, and estimate a position and an orientation of the index;
a target object estimation unit configured to estimate a position and an orientation of the tracking target object based on the position and the orientation of the index and a tracking target model;
a classification unit configured to determine and classify the plurality of pieces of feature information based on a position and an orientation of a camera that has captured the real space and the position and the orientation of the tracking target object; and
a construction unit configured to add a piece of feature information determined as belonging to the tracking target object by the classification unit, to the tracking target model,
wherein the image includes depth information,
wherein each of the plurality of pieces of feature information includes first three-dimensional coordinates of a corresponding one of a plurality of features in the image of the real space, the first three-dimensional coordinates being expressed in a coordinate system of the camera, and
wherein the classification unit is configured to calculate, for a piece of feature information being a target of the determination among the plurality of pieces of feature information, second three-dimensional coordinates by projecting the first three-dimensional coordinates onto a three-dimensional coordinate system that uses the position and the orientation of the index as a reference, and further determine, if the second three-dimensional coordinates are constant over two or more images of the real space captured at different times, that the piece of feature information being the target of the determination belongs to the tracking target object.

14. The non-transitory computer-readable storage medium according to claim 13, wherein the classification unit is configured to estimate an area to be determined as not being the tracking target object, in the image of the real space, as a mask area, and determine that a piece of feature information in the mask area among the plurality of pieces of feature information does not belong to the tracking target object.

15. The non-transitory computer-readable storage medium according to claim 13, wherein the index estimation unit is configured to use information obtained by partially modeling the tracking target object, as the index arranged on the tracking target object.

* * * * *